United States Patent
Telefus et al.

(10) Patent No.: US 9,287,792 B2
(45) Date of Patent: Mar. 15, 2016

(54) CONTROL METHOD TO REDUCE SWITCHING LOSS ON MOSFET

(75) Inventors: Mark Telefus, Orinda, CA (US); Wei Li, Shenzhen (CN)

(73) Assignee: Flextronics AP, LLC, Broomfield, CO (US)

( * ) Notice: Subject to any disclaimer, the term of this patent is extended or adjusted under 35 U.S.C. 154(b) by 36 days.

(21) Appl. No.: 13/584,543

(22) Filed: Aug. 13, 2012

(65) Prior Publication Data

US 2014/0043863 A1 Feb. 13, 2014

(51) Int. Cl.
  *H02M 3/335* (2006.01)
  *H02M 1/00* (2007.01)

(52) U.S. Cl.
  CPC ...... *H02M 3/33592* (2013.01); *H02M 3/33576* (2013.01); *H02M 2001/0058* (2013.01); *Y02B 70/1475* (2013.01); *Y02B 70/1491* (2013.01)

(58) Field of Classification Search
  CPC ... H02M 3/22; H02M 3/335; H02M 3/33507; H02M 3/33523; H02M 3/33538; H02M 3/33546; H02M 3/33553; H02M 3/33576; H02M 3/33592
  USPC .......... 363/15, 16, 17, 21.02, 21.03, 363/21.04–21.18; 323/234, 235
  See application file for complete search history.

(56) References Cited

U.S. PATENT DOCUMENTS

| | | |
|---|---|---|
| 4,234,920 A | 11/1980 | Van Ness et al. |
| 4,273,406 A | 6/1981 | Okagami |
| 4,327,298 A | 4/1982 | Burgin |
| 4,370,703 A | 1/1983 | Risberg |
| 4,563,731 A | 1/1986 | Sato et al. |
| 4,611,289 A | 9/1986 | Coppola |
| 4,642,616 A | 2/1987 | Goodwin |
| 4,645,278 A | 2/1987 | Yevak et al. |
| 4,658,204 A | 4/1987 | Goodwin |
| 4,703,191 A | 10/1987 | Ferguson |

(Continued)

FOREIGN PATENT DOCUMENTS

| | | |
|---|---|---|
| JP | 4217869 A | 8/1992 |
| JP | 10243640 A | 9/1998 |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Jeffrey Gblende
(74) *Attorney, Agent, or Firm* — Haverstock & Owens LLP

(57) ABSTRACT

A method of controlling a switching mode power converter enables zero voltage switching by forcing a voltage across the main switch to zero. This is accomplished by sensing when a current on the secondary side of the power converter drops to zero, or other threshold value, and then generating a negative current through the secondary winding in response. The negative secondary current results in a corresponding discharge current in the primary winding, which reduces the voltage across the main switch. The voltage across the main switch is monitored such that when the voltage reaches zero, or other threshold value, the main switch is turned ON. In this manner, the circuit functions as a bi-directional current circuit where a forward current delivers energy to a load and a reverse current provides control for reducing the voltage across the main switch to enable zero voltage switching.

32 Claims, 3 Drawing Sheets

(56) References Cited

U.S. PATENT DOCUMENTS

| | | |
|---|---|---|
| 4,712,160 A | 12/1987 | Sato et al. |
| 4,742,424 A | 5/1988 | Kautzer et al. |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 4,985,804 A | 1/1991 | Campbell et al. |
| 5,065,302 A | 11/1991 | Kanazawa |
| 5,090,919 A | 2/1992 | Tsuji |
| 5,101,322 A | 3/1992 | Ghaem et al. |
| 5,105,182 A | 4/1992 | Shindo |
| 5,132,890 A | 7/1992 | Blandino |
| 5,235,491 A | 8/1993 | Weiss |
| 5,283,792 A | 2/1994 | Davies et al. |
| 5,325,283 A | 6/1994 | Farrington |
| 5,365,403 A | 11/1994 | Vinciarelli et al. |
| 5,373,432 A | 12/1994 | Vollin |
| 5,437,040 A | 7/1995 | Campbell et al. |
| 5,442,540 A | 8/1995 | Hua |
| 5,673,185 A | 9/1997 | Albach et al. |
| 5,712,772 A | 1/1998 | Telefus et al. |
| 5,717,936 A | 2/1998 | Uskali |
| 5,768,118 A * | 6/1998 | Faulk et al. ................. 363/72 |
| 5,786,992 A | 7/1998 | Vinciarelli et al. |
| 5,790,395 A | 8/1998 | Hagen |
| 5,811,895 A | 9/1998 | Suzuki et al. |
| 5,838,171 A | 11/1998 | Davis |
| 5,838,554 A | 11/1998 | Lanni |
| 5,841,641 A | 11/1998 | Faulk |
| 5,859,771 A | 1/1999 | Kniegl |
| 5,923,543 A | 7/1999 | Choi |
| 5,949,672 A | 9/1999 | Bernet |
| 5,982,153 A | 11/1999 | Nagai et al. |
| 5,999,419 A | 12/1999 | Marrero |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,232,726 B1 | 5/2001 | Janczak |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,331,794 B1 | 12/2001 | Blanchard |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranuki |
| 6,459,175 B1 | 10/2002 | Potega |
| 6,487,098 B2 | 11/2002 | Malik et al. |
| 6,549,409 B1 | 4/2003 | Saxelby et al. |
| 6,578,253 B1 | 6/2003 | Herbert |
| 6,650,552 B2 | 11/2003 | Takagi et al. |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 6,990,000 B1 | 1/2006 | Rodriguez et al. |
| 7,035,126 B1 | 4/2006 | Lanni |
| 7,038,406 B2 | 5/2006 | Wilson |
| 7,061,195 B2 | 6/2006 | Ho et al. |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,215,560 B2 | 5/2007 | Soldano et al. |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,459,893 B2 | 12/2008 | Jacobs |
| 7,499,301 B2 | 3/2009 | Zhou |
| 7,545,256 B2 | 6/2009 | O'Toole et al. |
| 7,554,310 B2 | 6/2009 | Chapuis et al. |
| 7,564,706 B1 | 7/2009 | Herbert |
| 7,579,919 B1 | 8/2009 | Cao |
| 7,596,007 B2 | 9/2009 | Phadke et al. |
| 7,605,570 B2 | 10/2009 | Liu et al. |
| 7,630,221 B2 | 12/2009 | Sui et al. |
| 7,659,678 B2 | 2/2010 | Maiocchi |
| 7,679,347 B2 | 3/2010 | He et al. |
| 7,701,305 B2 | 4/2010 | Lin et al. |
| 7,924,578 B2 | 4/2011 | Jansen et al. |
| 7,956,592 B2 | 6/2011 | Morroni et al. |
| 7,990,122 B2 | 8/2011 | Sase et al. |
| 8,018,743 B2 | 9/2011 | Wang et al. |
| 8,049,481 B2 | 11/2011 | Li et al. |
| 8,059,434 B2 | 11/2011 | Huang et al. |
| 8,077,489 B2 | 12/2011 | Pellen |
| 8,094,473 B2 | 1/2012 | Moon et al. |
| 8,102,678 B2 | 1/2012 | Jungreis |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,194,417 B2 | 6/2012 | Chang |
| 8,199,541 B2 | 6/2012 | Yang |
| 8,207,717 B2 | 6/2012 | Uruno et al. |
| 8,243,472 B2 | 8/2012 | Chang et al. |
| 8,363,434 B2 | 1/2013 | Lin |
| 8,369,111 B2 | 2/2013 | Balakrishnan et al. |
| 8,385,032 B1 | 2/2013 | Mao et al. |
| 8,400,801 B2 | 3/2013 | Shinoda |
| 8,410,768 B2 | 4/2013 | Huber et al. |
| 8,743,565 B2 | 6/2014 | Telefus |
| 8,749,210 B1 | 6/2014 | Nakao et al. |
| 8,767,357 B2 | 7/2014 | Xie et al. |
| 2002/0008963 A1 | 1/2002 | DiBene, II et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2004/0062061 A1 * | 4/2004 | Bourdillon et al. ........ 363/21.12 |
| 2004/0149551 A1 | 8/2004 | Porter |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2005/0270001 A1 * | 12/2005 | Jitaru ........................... 323/247 |
| 2006/0002155 A1 | 1/2006 | Shteynberg et al. |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2006/0291512 A1 | 12/2006 | Borschowa |
| 2007/0040516 A1 | 2/2007 | Chen |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0196073 A1 | 8/2009 | Nakahori |
| 2009/0230929 A1 | 9/2009 | Sui et al. |
| 2009/0268487 A1 | 10/2009 | Park |
| 2009/0290384 A1 | 11/2009 | Jungreis |
| 2009/0290385 A1 | 11/2009 | Jungreis et al. |

(56) References Cited

U.S. PATENT DOCUMENTS

| | | |
|---|---|---|
| 2010/0039833 A1 | 2/2010 | Coulson et al. |
| 2010/0073964 A1 | 3/2010 | Tatsukawa et al. |
| 2010/0110732 A1* | 5/2010 | Moyer et al. ............... 363/19 |
| 2010/0156366 A1 | 6/2010 | Sakai et al. |
| 2010/0232180 A1 | 9/2010 | Sase et al. |
| 2010/0289466 A1 | 11/2010 | Telefus et al. |
| 2010/0322441 A1 | 12/2010 | Weiss et al. |
| 2011/0096573 A1 | 4/2011 | Zhu et al. |
| 2011/0109248 A1 | 5/2011 | Liu |
| 2011/0132899 A1 | 6/2011 | Shimomugi et al. |
| 2011/0157924 A1 | 6/2011 | Huynh |
| 2011/0255311 A1 | 10/2011 | Hsu et al. |
| 2011/0261590 A1 | 10/2011 | Liu |
| 2012/0112657 A1 | 5/2012 | Van Der Veen et al. |
| 2012/0153866 A1 | 6/2012 | Liu |
| 2012/0153917 A1 | 6/2012 | Adell et al. |
| 2012/0268084 A1 | 10/2012 | Wang et al. |
| 2013/0027011 A1 | 1/2013 | Shih et al. |
| 2013/0049709 A1 | 2/2013 | Fu et al. |
| 2013/0121038 A1* | 5/2013 | Ryu et al. ............... 363/21.14 |
| 2013/0148385 A1* | 6/2013 | Zhang ............... 363/21.12 |
| 2013/0155728 A1 | 6/2013 | Melanson |
| 2013/0329469 A1 | 12/2013 | Kubota |
| 2014/0078790 A1 | 3/2014 | Lin et al. |
| 2014/0091839 A1 | 4/2014 | Peters et al. |
| 2014/0153299 A1 | 6/2014 | Jeong et al. |
| 2015/0002108 A1 | 1/2015 | Kim |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

EE Times.com—"Wireless Beacon Could recharge Consumer Devices", by R. Colin Johnson, 3 pages, Nov. 6, 2007.

Hang-Seok Choi et al., Novel Zero Voltage and Zero-Current-Switching (ZVZCS) Full-Bridge PWM Converter Using Coupled Output Inductor, Sep. 2002 IEEE, pp. 641-648.

"N, Massachusetts Institute of Technology, Room 10-171, Cambridge, MA 02139, pp. 4074-4084.ew Architectures for Radio-Frequency dc/dc Power Conversion", Juan Rivas et al., Laboratory for Electromagnetic and Electronic Systems, Jan. 2004.

"Randomized Modulation in Power Electronic Converters", Aleksander M. Stankovic, member IEEE, and Hanoch Lev-Ari, No. 5 May 2002, pp. 782-799.

"Analysis and Special Characteristics of a Spread-Spectrum Technique for Conducted EMI Suppression", K.K. Tse, et al. member IEEE, IEEE Transactions on Power Electronics, vol. 15.,No. 2, Mar. 2000, pp. 399-410.

* cited by examiner

CONTROL METHOD TO REDUCE SWITCHING LOSS ON MOSFET

FIELD OF THE INVENTION

The present invention is generally directed to the field of power converters. More specifically, the present invention is directed to controlling the switching of a switching device used in a power converter to reduce switching loss.

BACKGROUND OF THE INVENTION

There are several power converter topologies that have been developed over the years, which are intended to improve the power density and switching efficiency of power converters. An emerging focus of new converter topologies is to provide a means to reduce or eliminate converter switching losses, while increasing the switching frequencies. Lower loss and higher switching frequency means more efficient converters, which can reduce the size and weight of converter components. Additionally, with the introduction of high speed composite semiconductor switches, such as metal oxide semiconductor field effect transistor (MOSFET) switches operated by pulse width modulation (PWM), recent forward and flyback topologies are now capable of operation at greatly increased switching frequencies, such as, for example, up to 1.0 MHz.

However, an increase in switching frequency can cause a corresponding increase in switching and component stress related losses, as well as increased electromagnetic interference (EMI), noise, and switching commutation problems, due to the rapid ON/OFF switching of the semiconductor switches at high voltage and/or high current levels. Moreover, modern electronic components are expected to perform multiple functions, in a small space, efficiently, and with few undesirable side effects. For instance, a modern voltage converter that provides for relatively high power density and high switching frequencies, should also include uncluttered circuit topologies, provide for isolation of the output or "load" voltage from the input or "source" voltage, and also provide for variable step-up or step-down voltage transformation.

FIG. 1 illustrates a conventional flyback type voltage converter. The converter 10 includes a transistor T1, a controller 14, a transformer 12, a capacitor C1, and a diode D1. Input voltage to the circuit may be unregulated DC voltage derived from an AC supply after rectification and filtering. The transistor T1 is a fast-switching device, such as a MOSFET, the switching of which is controlled by a fast dynamic controller 14 to maintain a desired output voltage Vout. The secondary winding voltage is rectified and filtered using the diode D1 and the capacitor C1. The transformer 12 of the flyback converter functions differently than a typical transformer. Under load, the primary and secondary windings of a typical transformer conduct simultaneously. However, in the flyback converter, the primary and secondary windings of the transformer do not carry current simultaneously. In operation, when the transistor T1 is turned ON, the primary winding of the transformer 12 is connected to the input supply voltage such that the input supply voltage appears across the primary winding, resulting in an increase of magnetic flux in the transformer 12 and the primary winding current rises linearly. However, with the transistor T1 turned ON, the diode D1 is reverse biased and there is no current through the secondary winding. Even though the secondary winding does not conduct current while the transistor T1 is turned ON, the load, represented as resistor Rload, coupled to the capacitor C1 receives uninterrupted current due to previously stored charge on the capacitor.

When the transistor T1 is turned OFF, the primary winding current path is broken and the voltage polarities across the primary and secondary windings reverse, making the diode D1 forward biased. As such, the primary winding current is interrupted but the secondary winding begins conducting current thereby transferring energy from the magnetic field of the transformer to the output of the converter. This energy transfer includes charging the capacitor C1 and delivery energy to the load. If the OFF period of the transistor T1 is sufficiently long, the secondary current has sufficient time to decay to zero and the magnetic field energy stored in the transformer 12 is completely dissipated.

The flyback topology has long been attractive because of its relative simplicity when compared with other topologies used in low power application. The flyback "transformer" serves the dual purpose of providing energy storage as well as converter isolation, theoretically minimizing the magnetic component count when compared with, for example, the forward converter. Increasing the switching frequency is an effective way of reducing the size and weight of the overall power supply. A drawback to use of the flyback is the relatively high voltage and current stress suffered by the switching components. Additionally, high turn-off voltage (caused by the parasitic oscillation between transformer leakage inductance and switch capacitance) seen by the primary switch traditionally requires the use of a resistor, capacitor, diode subcircuit, such as a snubber circuit. This parasitic oscillation is extremely rich in harmonics and pollutes the environment with EMI, and causes high switching losses from the switching components in the form of extra thermal dissipation.

In an effort to reduce or eliminate the switching losses and reduce EMI noise the use of "resonant" or "soft" switching techniques has been increasingly employed in the art. The application of resonant switching techniques to conventional power converter topologies offers many advantages for high density, and high frequency, to reduce or eliminate switching stress and reduce EMI. However, the complexity required to provide control to the power switches, such as the transistor T1 in FIG. 1, and the components associated with complex controls, create a limited use in commercial applications.

Resonant switching techniques generally include an inductor-capacitor (LC) subcircuit in series with a semiconductor switch which, when turned ON, creates a resonating subcircuit within the converter. Further, timing the ON/OFF control cycles of the resonant switch to correspond with particular voltage and current conditions across respective converter components during the switching cycle allows for switching under low or zero voltage and/or low or zero current conditions. Zero voltage switching (ZVS) and/or zero current switching (ZCS) inherently reduces or eliminates many frequency related switching losses.

The application of such resonant switching techniques to conventional power converter topologies offers many advantages for high density, high frequency converters, such as quasi sinusoidal current waveforms, reduced or eliminated switching stresses on the electrical components of the converter, reduced frequency dependent losses, and/or reduced EMI. However, energy losses incurred during control of zero voltage switching and/or zero current switching, and losses incurred during driving, and controlling the resonance means, are still problematic.

In the flyback converter that is commonly used in small power products, such as a charger or adaptor power supply, the converter operates in a discontinuous mode, which means the current through the primary winding of the transformer is allowed to fall to zero. In one approach, this converter utilizes the resonance which occurs after the freewheeling current drops to zero to discharge the drain to source parasitic capacitance of the switching transistor. While the resonance voltage reaches a valley point, the transistor is turned ON to achieve low voltage turn on, and even zero voltage turn on at certain conditions. The valley voltage level achieved during resonance depends on the input voltage level and the reflected output voltage on the primary winding of the transformer. However, the lower the valley voltage level, the higher the voltage spike across the transistor when the transistor is switched OFF. As such, the valley voltage level is limited by the corresponding stress applied to the transistor when switched OFF. The stress to the transistor increases with increasing input voltage.

In another approach, a capacitor is added across the freewheeling diode on the secondary side of the flyback converter. After freewheeling current drops to zero, the reverse voltage across the diode charges the capacitor. The charge current reflects to the primary side of the circuit and generates a discharge current applied to the transistor, which pulls down the drain to source voltage. The transistor drain to source voltage can be zero at turn on as long as the discharge current is high enough. However, the resonant current between the transformer and the added capacitor across the freewheeling diode increases the current stress on the secondary winding and leads to additional conductive dissipation.

SUMMARY OF THE INVENTION

Embodiments of a switching mode power converter are directed to methods of control that enable zero, or near-zero, voltage switching by forcing a voltage across the main switch to zero, or near-zero. This is accomplished by sensing when a current on the secondary side of the power converter drops to zero, or other threshold value, and then generating a negative current through the secondary winding in response to this event. The negative secondary current results in a corresponding discharge current in the primary winding, which reduces the voltage across the main switch, such as by discharging a parasitic capacitance across a switching transistor. The voltage across the main switch is monitored such that when the voltage reaches zero, or other threshold value, the main switch is turned ON. In this manner, the circuit functions as a bi-directional current circuit where a forward current delivers energy to a load and a reverse current provides control for reducing the voltage across the main switch to enable zero voltage switching.

In an aspect, a method of controlling a switching mode power converter is disclosed. The method includes configuring a switching mode power converter having a transformer, an output circuit coupled to a secondary winding of the transformer, and a switch coupled to a primary winding of the transformer. The method also includes determining a threshold condition in the output circuit for which the switch is to be switched ON. The method also includes enabling a negative secondary current through the secondary winding of the transformer in response to determining the threshold condition, wherein the negative secondary current generates a corresponding discharge current through the primary winding, further wherein the discharge current reduces a voltage across the switch. The method also includes determining when the voltage across the switch drops to a threshold value, and switching the switch ON once the voltage drops to the threshold value.

In some embodiments, the switch is a transistor and the discharge current discharges a parasitic capacitance of the transistor, thereby reducing the voltage across the transistor. In some embodiments, the threshold value is substantially zero volts, thereby enabling zero voltage switching. In some embodiments, the method also includes sensing a value of a secondary current through the secondary winding of the transformer, wherein the threshold condition in the output circuit corresponds to the value of the secondary current changing from a positive value to zero. In some embodiments, enabling the negative secondary current includes generating a drive signal to enable the negative secondary current, wherein the drive signal includes a delay after the secondary current changes from the positive value to zero. In some embodiments, enabling the negative secondary current includes enabling an alternative current path from an output capacitor in the output circuit to the secondary winding. In some embodiments, the negative secondary current is generated as discharge from the output capacitor when the alternative current path is enabled. In some embodiments, enabling the alternative current path includes switching ON a second switch within the alternate current path. In some embodiments, the switching mode power converter is configured as one of a flyback-type power converter circuit, a forward-type power converter circuit, a push-pull-type power converter circuit, a half-bridge-type power converter circuit, and a full-bridge-type power converter circuit.

In another aspect, another method of controlling a switching mode power converter is disclosed. The method includes configuring a switching mode power converter having a transformer, an output circuit coupled to a secondary winding of the transformer, and a switch coupled to a primary winding of the transformer, wherein the power converter circuit is configured to store energy in the primary winding while the switch is ON and a positive primary current flows through the primary winding, and to deliver the stored energy from the primary winding to the output circuit while the switch is OFF and a positive secondary current flows through the secondary winding. The method also includes sensing the secondary current to determine when the secondary current drops from positive to zero while the switch is OFF. The method also includes enabling a negative secondary current through the secondary winding upon determining that the secondary current drops from positive to zero, wherein the negative secondary current generates a corresponding negative primary current through the primary winding, further wherein the negative primary current reduces a voltage across the switch. The method also includes determining when the voltage across the switch drops to a threshold value, and switching the switch ON once the voltage drops to the threshold value.

In some embodiments, the switch is a transistor and the negative primary current discharges a parasitic capacitance of the transistor, thereby reducing the voltage across the transistor. In some embodiments, the threshold value is substantially zero volts, thereby enabling zero voltage switching. In some embodiments, enabling the negative secondary current includes enabling an alternative current path from an output capacitor in the output circuit to the secondary winding. In some embodiments, the negative secondary current is generated as discharge from the output capacitor when the alternative current path is enabled. In some embodiments, enabling the alternative current path includes switching ON a second switch within the alternate current path. In some embodiments, the power converter circuit is configured as a flyback-type converter circuit. In some embodiments, enabling the negative secondary current includes generating a drive signal to enable the negative secondary current, wherein the drive signal includes a delay after the secondary current drops from the positive value to zero.

In yet another aspect, a switching mode power converter is disclosed. The power converter includes a transformer having a primary winding coupled to an input supply voltage and a secondary winding, a switch coupled in series to the primary winding, a first controller coupled to the switch, wherein the first controller is configured to turn the switch ON and OFF, and an output circuit coupled to the secondary winding. The output circuit includes a second controller configured to determine a threshold condition in the output circuit for which the switch is to be switched ON. The second controller is further configured to enable a negative secondary current through the secondary winding of the transformer in response to determining the threshold condition. The negative secondary current generates a corresponding discharge current through the primary winding that reduces a voltage across the switch. The first controller is further configured to determine when the voltage across the switch drops to a threshold value, and to switch ON the switch once the voltage drops to the threshold value.

In some embodiments, the switch is a transistor and the discharge current discharges a parasitic capacitance of the transistor, thereby reducing the voltage across the transistor. In some embodiments, the threshold value is substantially zero volts, thereby enabling zero voltage switching. In some embodiments, the output circuit also includes a sensing circuit coupled to the secondary winding and to the second controller, wherein the second controller is configured to determine a value of a secondary current through the secondary winding of the transformer according to data sensed by the sensing circuit, wherein the threshold condition in the output circuit corresponds to the value of the secondary current changing from a positive value to zero. In some embodiments, the sensing circuit is a voltage divider circuit.

In some embodiments, the output circuit also includes a diode coupled in series to the secondary winding of the transformer and an output capacitor coupled in series to the diode, wherein the diode is configured to enable current flow from the secondary winding to the output capacitor when forward-biased. In some embodiments, the output circuit also includes a second switch coupled in parallel to the diode, further wherein the second controller is coupled to the second switch, the second controller is configured to turn the second switch ON and OFF. In some embodiments, the second controller is further configured to generate a drive signal for the second switch, wherein the drive signal includes a delay after the threshold condition in the output circuit is determined. In some embodiments, when the second switch is ON, an alternative current path is formed between the output capacitor and the secondary winding of the transformer, further wherein the negative secondary current flows from the output capacitor to the secondary winding via the alternative current path. In some embodiments, the negative secondary current is generated as discharge from the output capacitor when the alternative current path is formed. In some embodiments, the output circuit is configured as a bi-directional current flow circuit, wherein a first current flow direction corresponds to positive secondary current from the secondary winding to the output capacitor and to an output of the output circuit to deliver power, and a second current flow direction corresponds to negative secondary current from the output capacitor to the secondary winding to provide control for switching the switch coupled to the primary winding. In some embodiments, the second switch is a transistor.

In some embodiments, the power converter also includes a sensing circuit coupled to the switch and to the first controller, wherein the first controller is configured to determine the voltage across the switch according to data sensed by the sensing circuit. In some embodiments, the power converter is configured as one of a flyback-type power converter circuit, a forward-type power converter circuit, a push-pull-type power converter circuit, a half-bridge-type power converter circuit, and a full-bridge-type power converter circuit.

In still yet another aspect, another switching mode power converter is disclosed. The power converter includes a transformer, a first switch, a first controller, a diode, a second switch, a second controller, an output capacitor, and a sensing circuit. The transformer has a primary winding coupled to an input supply voltage and a secondary winding. The first switch is coupled in series to the primary winding. The first controller is coupled to the first switch, wherein the first controller is configured to turn the first switch ON and OFF. The diode is coupled in series to the secondary winding. The second switch is coupled in parallel to the diode. The second controller is coupled to the second switch, wherein the second controller is configured to turn the second switch ON and OFF. The output capacitor is coupled to the diode and to the second switch. The sensing circuit is coupled to the secondary winding and to the second controller. The second controller is configured to determine a threshold condition according to data sensed by the sensing circuit and to switch ON the second switch when the threshold condition is achieved thereby forming an alternative current path for a negative secondary current to flow from the output capacitor to the secondary winding. The negative secondary current generates a corresponding discharge current through the primary winding that reduces a voltage across the first switch. The first controller is further configured to determine when the voltage across the first switch drops to a threshold value, and to switch ON the first switch once the voltage drops to the threshold value.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
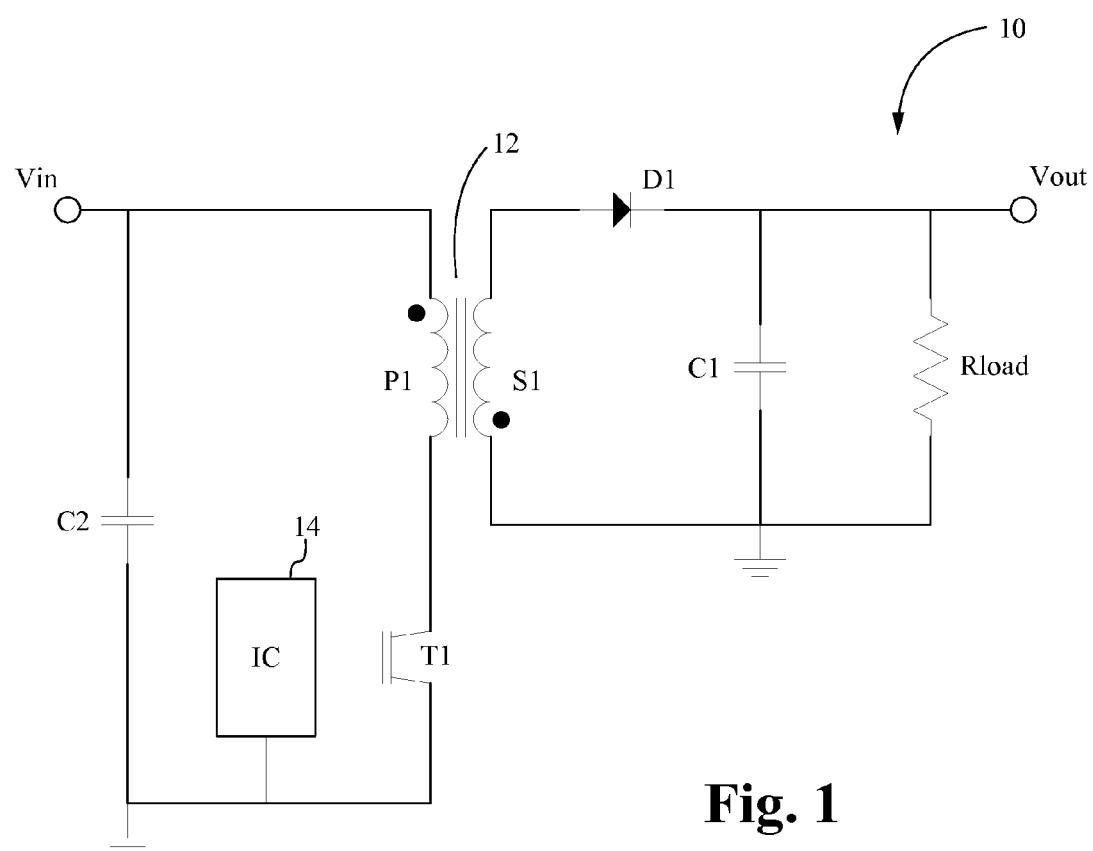
FIG. 1 illustrates a conventional flyback type voltage converter.
Figure 2:
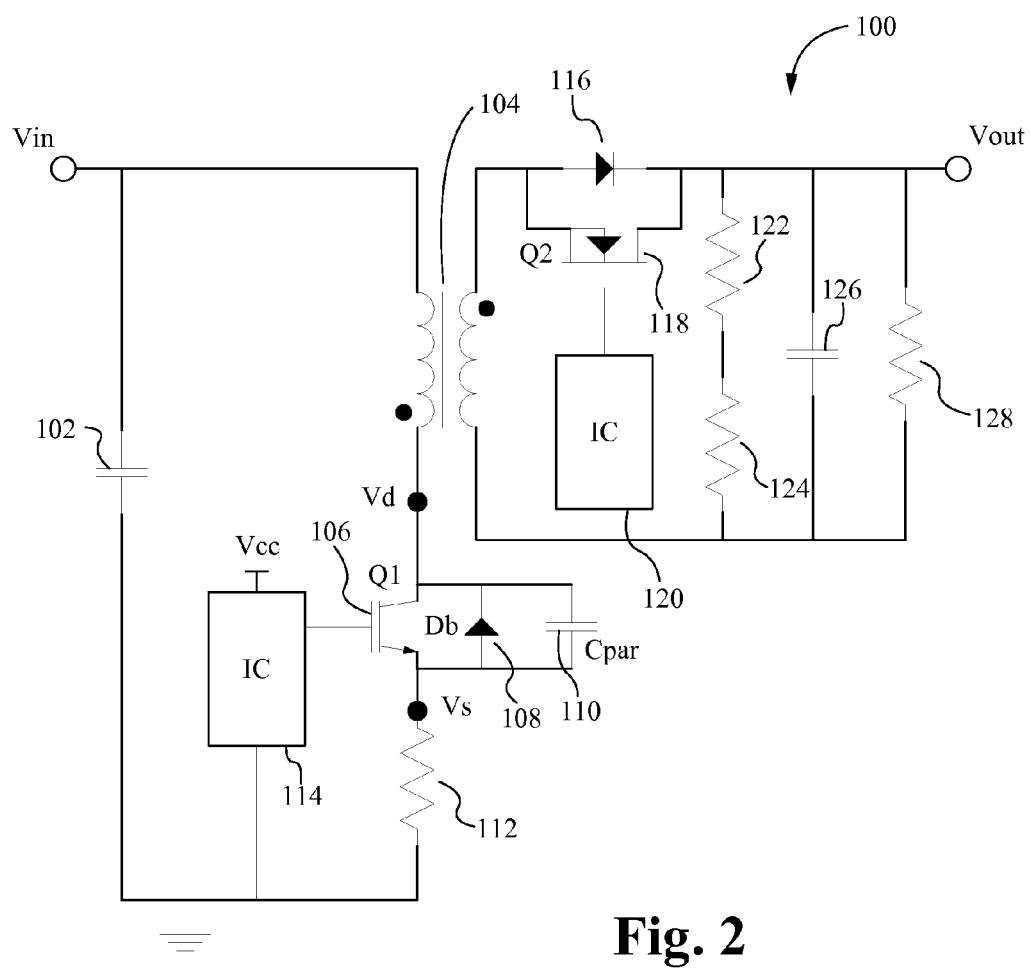
FIG. 2 illustrates a power converter according to an embodiment.

FIG. 2 illustrates a power converter according to an embodiment. The power converter 100 is configured to receive an unregulated DC voltage signal at an input node Vin and to provide a regulated output voltage Vout. Input voltage to the circuit may be unregulated DC voltage derived from an AC supply after rectification. The input voltage is typically filtered, such as via capacitor 102. In some embodiments, the output voltage level is suitable for many low voltage appliances such as computer laptops, cell phones and other hand held devices. In an exemplary embodiment the output voltage Vout can be set within the range 5-40 VDC. Alternatively, the power converter 100 can provide the output voltage Vout that is less than 5 VDC or greater than 40 VDC.

The power converter 100 is configured as a flyback converter. It is understood that the concepts described herein can be applied to alternatively configured switched mode converters including, but not limed to, a forward converter, a push-pull converter, a half-bridge converter, and a full-bridge converter. The power converter 100 includes a switch 106, a controller 114, a sense resistor 112, and a transformer 104. The switch 106 is coupled in series with a primary winding of the transformer 104 and the sense resistor 112. The controller 114 is coupled to the switch 106 to turn the switch ON and OFF.

The power converter 100 further includes output circuitry coupled to a secondary winding of the transformer 104. The output circuitry includes a freewheeling rectifier diode 116, a switch 118, a controller 120, and an output capacitor 126. The switch 118 is coupled in parallel to the diode 116. An anode of the diode 116 is coupled to a first terminal of the secondary winding. A cathode of the diode 116 is coupled to a first terminal of the output capacitor 126 and coupled to the output node Vout. The output capacitor 126 is coupled to the Vout node across an output load, represented by a resistor 128. The controller 120 is coupled to the switch 118 to turn the switch ON and OFF. The output circuitry also includes a sensing circuit configured to measure a current, Isec, of the secondary winding. In the exemplary configuration of FIG. 2, the sensing circuit includes a resistive voltage divider including the resistors 122 and 124 coupled in parallel to the capacitor 126 to measure a voltage across the capacitor 126. In an alternative configuration (not shown), the sensing circuit can include a resistive voltage divider coupled in parallel to the secondary winding. In general, the sensing circuit can be configured to use any conventional technique for determining the value of the secondary current Isec.

The switch 106 and the switch 118 are each a suitable switching device. In an exemplary embodiment, the switch 106 and the auxiliary switch 118 are each a n-type metal-oxide-semiconductor field-effect transistor (MOSFET) device. Alternatively, any other semiconductor switching device known to a person of skill in the art can be substituted for the switch 106 and/or the switch 118. Subsequent description is based on an n-channel MOSFET. The parasitic capacitance of the transistor 106 is represented as parasitic capacitor 110, and the inherent body diode of the transistor 106 is represented as body diode 108.

The power converter 100 is configured for switched mode power delivery using zero voltage switching of the transistor 106. In operation, when the transistor 106 is ON, the drain to source voltage Vds is essentially zero. In implementation, the value of the resistor 112 is very small so the voltage drop across the resistor is negligible. As such, zero voltage switching is automatically achieved when switching the transistor 106 from ON to OFF. However, when the transistor 106 is OFF, the parasitic capacitance of the transistor results in a non-zero drain to source voltage Vds. Before the transistor 106 is turned from OFF to ON, the drain to source voltage Vds is forced to zero, or near-zero. To force the drain to source voltage Vds to zero, the output circuit is configured to generate a negative secondary current Isec through the secondary winding of the transformer 104. The negative secondary current Isec reflects to the primary side of the circuit and generates a negative primary current, or discharge current, Ipri applied to the transistor 106. The discharge current pulls down the drain to source voltage Vds. The controller 114 is configured to turn ON the transistor 106 when the drain to source voltage Vds is zero, or other non-zero threshold value, thereby providing zero voltage switching. In some embodiments, the controller 114 senses a source voltage Vs, and determines according to the sensed source voltage Vs when the corresponding drain to source voltage Vds equals zero. It is understood that alternative configurations can be used to sense circuit conditions and determine when the drain to source voltage Vds equals zero.

Figure 3:
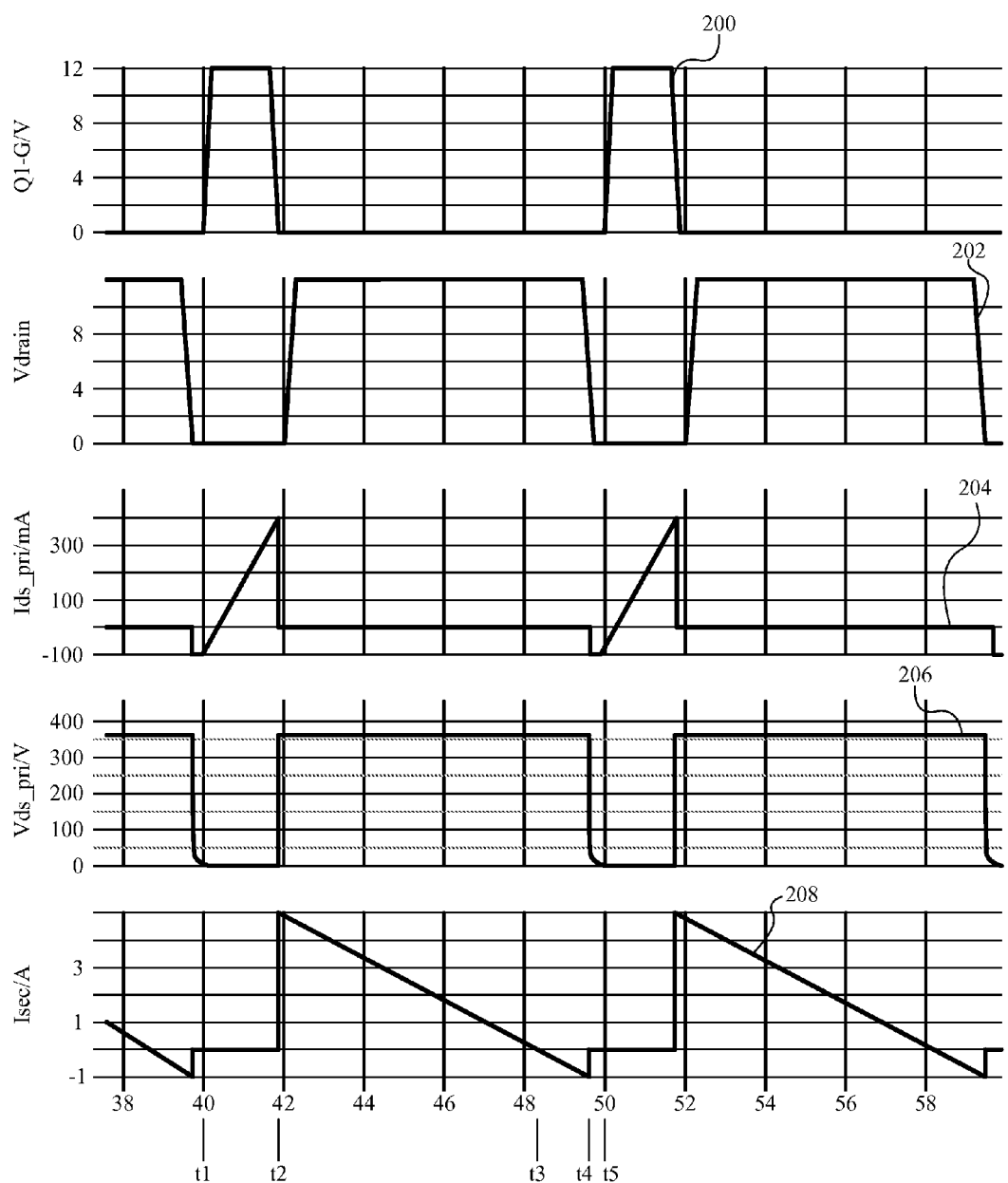
FIG. 3 illustrates exemplary voltage and current waveforms corresponding to operation of the power converter of FIG. 2.

FIG. 3 illustrates exemplary voltage and current waveforms corresponding to operation of the power converter 100 of FIG. 2. A waveform 200 shows the gate voltage Vg of the transistor 106. A waveform 202 shows the drain voltage Vd of the transistor 106. A waveform 204 shows the primary current Ipri through the primary winding of the transformer 104. A waveform 206 shows the drain to source voltage Vds of the transistor 106. A waveform 208 shows the secondary current Isec through the secondary winding of the transformer 104.

As shown in waveform 200, the transistor 106 is OFF when the gate voltage Vg is low, in this case zero volts, and the transistor 106 is ON when the gate voltage Vg is high, in this case 12 volts. At time t1, the gate voltage Vg goes high and the transistor 106 is turned ON. When the transistor 106 is ON, the drain voltage Vd is zero volts, as shown in waveform 202. The value of the resistor 112 is very small and therefore the voltage drop across the resistor is negligible. The drain voltage Vd stays at zero volts until after the transistor 106 turns OFF.

When the transistor 106 turns ON at time t1, the primary current Ipri ramps upward as shown in waveform 204. Since the power converter 100 has a flyback configuration, the diode 116 is reverse-biased when the transistor 106 is ON. Due to the reverse-biased diode 116, the secondary current Isec is zero, as shown in waveform 208, while the transistor 106 is ON. While the transistor 106 remains ON, the primary winding of the transformer 104 stores energy due to the positive primary current Ipri.

At time t2, the gate voltage Vg goes low and the transistor 106 is turned OFF. When the transistor 106 is turned OFF, the primary current Ipri goes to zero, and the drain voltage Vd and the drain to source voltage Vds go high. With the drain voltage Vd high, the diode 116 becomes forward-biased. The energy stored in the primary winding of the transformer 104 induces a positive secondary current Isec, which is delivered through the forward-biased diode 116 to the output node Vout. In this manner, energy is delivered to the load, and energy is also stored in the capacitor 126. The value of the secondary current Isec decreases as the energy stored in the primary winding dissipates until the energy is completely dissipated and the secondary current Isec is zero, which corresponds to time t3 in FIG. 3.

In conventional flyback power converters, if the transistor remains OFF when the secondary current Isec reaches zero, such as at time t3, then the energy stored as parasitic capacitance in the transistor results in a resonant circuit formed by the primary winding and the equivalent parasitic capacitor of the transistor. In this resonant circuit, the drain voltage Vd oscillates up and down. The transistor is turned ON at one of the low points of the oscillating drain voltage Vd.

In contrast, the power converter of the present application is configured to control the parasitic capacitance across the transistor 106 and drive the drain to source voltage Vds to zero, or near-zero, prior to turning ON the transistor. The sensing circuit and controller in the output circuit sense and determine when the secondary current Isec reaches zero. In the exemplary configuration of FIG. 3, the controller 120 is configured to sense and determine the secondary current Isec via the resistive voltage divider formed by resistors 122 and 124. When the secondary current Isec reaches zero, at time t3 in FIG. 3, the controller 120 turns ON transistor 118. With the transistor 118 ON, an alternate current path is formed from the positively charged capacitor 126 to the secondary winding of the transformer 104, thereby by-passing the forward-biased diode 116. Without this alternative current path, any negative current due to the positively charged capacitor 126 is blocked by the forward-biased diode 116. The alternative current path enables negative current to flow from the positively charged capacitor 126, through the ON transistor 118, and through the secondary winding. This negative current is shown in waveform 208 as negative secondary current Isec from time t3 to time t4. The negative secondary current Isec reflects to the primary side of the circuit. When the negative secondary current Isec achieves a threshold value, at time t4, a negative primary current Ipri, or discharge current, is induced. The negative primary current Ipri discharges the parasitic capacitance of the transistor 106, thereby driving down the drain to source voltage Vds.

The controller 114 determines when the drain to source voltage Vds is pulled down to zero volts, which corresponds to time t5 in FIG. 3. When the controller 114 determines that the drain to source voltage Vds is zero, or within an acceptable range of zero, the transistor 106 is turned ON, thereby achieving zero voltage switching. The discharge current level is easily programmed by adjusting a turn off delay of the transistor 118 after the secondary current Isec drops to zero. The longer the turn off delay, the higher the discharge current. The control scheme ensures sufficient discharge current is generated for discharging the parasitic capacitance and reducing the drain to source voltage Vds to zero.

In this manner, the power converter is configured to drive the drain to source voltage Vds of the switching transistor to zero to achieve zero voltage switching. The power converter is not using the oscillations of a resonant circuit to time the transistor switching. The power converter is also not using a feedback signal to signal the controller 114 when to switch ON the transistor 106. The power converter is configured as a bi-directional circuit. A positive secondary current Isec is delivered in a first direction through the secondary winding to deliver power, and a negative secondary current Isec is delivered in a second direction through the secondary winding to force zero voltage switching of the transistor 106. This control scheme for enabling zero voltage switching does not introduce any extra voltage stress on the transistor 106.

In some embodiments, the controller 120 generates a drive signal for the transistor 118 with a delay after the secondary current Isec drops to zero. During the delay, the parasitic capacitance of the transistor 106 is resonating with the leakage inductance and therefore there is no impact to turning on the transistor 106 after the delay. With this delay, the power converter can operate in Discontinuous Current Mode (DCM) and fixed frequency switching. This delay makes skip cycle (burst mode) feasible for light loads in either DCM or Critical DCM.

In an alternative configuration, a bi-directional switch is used in place of the diode 116 and the transistor 118. A body diode of the bi-directional switch functions as the freewheeling diode 116. Control of the bi-directional switch is the same as the transistor 118 to enable a negative secondary current Isec.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of controlling a switching mode power converter comprising:
   providing a switching mode power converter having a transformer, an output circuit coupled to a secondary winding of the transformer, and a switch coupled to a primary winding of the transformer;
   determining when a threshold condition is met in the output circuit;
   actively enabling a negative secondary current through the secondary winding of the transformer with the output circuit in direct response to the threshold condition being met, wherein the negative secondary current generates a corresponding discharge current through the primary winding, further wherein the discharge current reduces a voltage across the switch;
   determining when the voltage across the switch drops to a threshold value; and
   switching the switch ON in direct response to the voltage equaling the threshold value.

2. The method of claim 1 wherein the switch comprises a transistor and the discharge current discharges a parasitic capacitance of the transistor, thereby reducing the voltage across the transistor.

3. The method of claim 1 wherein the threshold value is substantially zero volts, thereby enabling zero voltage switching.

4. The method of claim 1 further comprising sensing a value of a secondary current through the secondary winding of the transformer, wherein the threshold condition in the output circuit corresponds to the value of the secondary current changing from a positive value to zero.

5. The method of claim 4 wherein enabling the negative secondary current comprises generating a drive signal to enable the negative secondary current, wherein the drive signal continues for a predetermined delay period after the secondary current changes from the positive value to zero.

6. The method of claim 1 wherein enabling the negative secondary current comprises enabling an alternative current path from an output capacitor in the output circuit to the secondary winding.

7. The method of claim 6 wherein the negative secondary current is generated as discharge from the output capacitor when the alternative current path is enabled.

8. The method of claim 6 wherein enabling the alternative current path comprises switching ON a second switch within the alternate current path.

9. The method of claim 1 wherein the switching mode power converter is configured as one of a flyback-type power converter circuit, a forward-type power converter circuit, a push-pull-type power converter circuit, a half-bridge-type power converter circuit, and a full-bridge-type power converter circuit.

10. A method of controlling a switching mode power converter comprising:
providing a switching mode power converter having a transformer, an output circuit coupled to a secondary winding of the transformer, and a switch coupled to a primary winding of the transformer, wherein the switch mode power converter is configured to store energy in the primary winding while the switch is ON and a positive primary current flows through the primary winding, and to deliver the stored energy from the primary winding to the output circuit while the switch is OFF and a positive secondary current flows through the secondary winding;
sensing the secondary current to determine when the secondary current drops from positive to zero while the switch is OFF;
actively enabling a negative secondary current through the secondary winding with the output circuit in direct response to the secondary current dropping from positive to zero, wherein the negative secondary current generates a corresponding negative primary current through the primary winding, further wherein the negative primary current reduces a voltage across the switch;
determining when the voltage across the switch drops to a threshold value; and
switching the switch ON in direct response to the voltage equaling the threshold value.

11. The method of claim 10 wherein the switch comprises a transistor and the negative primary current discharges a parasitic capacitance of the transistor, thereby reducing the voltage across the transistor.

12. The method of claim 10 wherein the threshold value is substantially zero volts, thereby enabling zero voltage switching.

13. The method of claim 10 wherein enabling the negative secondary current comprises enabling an alternative current path from an output capacitor in the output circuit to the secondary winding.

14. The method of claim 13 wherein the negative secondary current is generated as discharge from the output capacitor when the alternative current path is enabled.

15. The method of claim 13 wherein enabling the alternative current path comprises switching ON a second switch within the alternate current path.

16. The method of claim 10 wherein the power converter circuit is configured as a flyback-type converter circuit.

17. The method of claim 10 wherein enabling the negative secondary current comprises generating a drive signal to enable the negative secondary current, wherein the drive signal includes a delay after the secondary current drops from the positive value to zero.

18. A switch mode power converter comprising:
a transformer having a primary winding coupled to an input supply voltage and a secondary winding;
a switch coupled in series to the primary winding;
a first controller coupled to the switch, wherein the first controller is configured to turn the switch ON and OFF; and
an output circuit coupled to the secondary winding, wherein the output circuit comprises a second controller configured to determine a threshold condition in the output circuit, and further wherein the second controller causes the switch to be switched ON in direct response to the threshold condition being met thereby actively enabling a negative secondary current through the secondary winding of the transformer in direct response to determining the threshold condition, wherein the negative secondary current generates a corresponding discharge current through the primary winding that reduces a voltage across the switch, wherein the first controller is further configured to determine when the voltage across the switch drops to a threshold value, and to switch ON the switch in direct response to the voltage equaling the threshold value.

19. The power converter of claim 18 wherein the switch comprises a transistor and the discharge current discharges a parasitic capacitance of the transistor, thereby reducing the voltage across the transistor.

20. The power converter of claim 18 wherein the threshold value is substantially zero volts, thereby enabling zero voltage switching.

21. The power converter of claim 18 wherein the output circuit further comprises a sensing circuit coupled to the secondary winding and to the second controller, wherein the second controller is configured to determine a value of a secondary current through the secondary winding of the transformer according to data sensed by the sensing circuit, wherein the threshold condition in the output circuit corresponds to the value of the secondary current changing from a positive value to zero.

22. The power converter of claim 21 wherein the sensing circuit comprises a voltage divider circuit.

23. The power converter of claim 18 wherein the output circuit further comprises a diode coupled in series to the secondary winding of the transformer and an output capacitor coupled in series to the diode, wherein the diode is configured to enable current flow from the secondary winding to the output capacitor when forward-biased.

24. The power converter of claim 23 wherein the output circuit further comprises a second switch coupled in parallel to the diode, further wherein the second controller is coupled to the second switch, the second controller is configured to turn the second switch ON and OFF.

25. The power converter of claim 24 wherein the second controller is further configured to generate a drive signal for the second switch, wherein the drive signal includes a delay after the threshold condition in the output circuit is determined.

26. The power converter of claim 24 wherein when the second switch is ON, an alternative current path is formed between the output capacitor and the secondary winding of the transformer, further wherein the negative secondary current flows from the output capacitor to the secondary winding via the alternative current path.

27. The power converter of claim 26 wherein the negative secondary current is generated as discharge from the output capacitor when the alternative current path is formed.

28. The power converter of claim 26 wherein the output circuit is configured as a bi-directional current flow circuit, wherein a first current flow direction corresponds to positive secondary current from the secondary winding to the output capacitor and to an output of the output circuit to deliver power, and a second current flow direction corresponds to negative secondary current from the output capacitor to the secondary winding to provide control for switching the switch coupled to the primary winding.

29. The power converter of claim 24 wherein the second switch comprises a transistor.

30. The power converter of claim 18 further comprising a sensing circuit coupled to the switch and to the first controller, wherein the first controller is configured to determine the voltage across the switch according to data sensed by the sensing circuit.

31. The power converter of claim 18 wherein the power converter is configured as one of a flyback-type power converter circuit, a forward-type power converter circuit, a push-pull-type power converter circuit, a half-bridge-type power converter circuit, and a full-bridge-type power converter circuit.

32. A switch mode power converter comprising:
a transformer having a primary winding coupled to an input supply voltage and a secondary winding;
a first switch coupled in series to the primary winding;
a first controller coupled to the first switch, wherein the first controller is configured to turn the first switch ON and OFF;
a diode coupled in series to the secondary winding;
a second switch coupled in parallel to the diode, wherein the diode is not a part of the second switch;
a second controller coupled to the second switch, wherein the second controller is configured to turn the second switch ON and OFF;
an output capacitor coupled to the diode and to the second switch; and
a sensing circuit coupled to the secondary winding and to the second controller, wherein the second controller is configured to determine a threshold condition according to data sensed by the sensing circuit and to switch ON the second switch in direct response to the threshold condition being achieved thereby forming an alternative current path for a negative secondary current to flow from the output capacitor to the secondary winding, the negative secondary current generates a corresponding discharge current through the primary winding that reduces a voltage across the first switch, wherein the first controller is further configured to determine when the voltage across the first switch drops to a threshold value, and to switch ON the first switch in direct response to the voltage equaling the threshold value.

* * * * *